(12) United States Patent
Liang et al.

(10) Patent No.: US 8,769,314 B2
(45) Date of Patent: Jul. 1, 2014

(54) TEST FIXTURE AND METHOD USING THE DTR PINS AND CTS PINS OF RS-232 CONNECTORS FOR AUTOMATICALLY TURNING ON COMPUTERS

(75) Inventors: Zhi-Chun Liang, Shenzhen (CN); Jun-Min Chen, Shenzhen (CN); Zhi-Jian Long, Shenzhen (CN); Fang Tian, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 929 days.

(21) Appl. No.: 12/857,577

(22) Filed: Aug. 17, 2010

(65) Prior Publication Data
US 2011/0270565 A1 Nov. 3, 2011

(30) Foreign Application Priority Data
Apr. 29, 2010 (CN) .......................... 2010 1 0160106

(51) Int. Cl.
*G06F 1/00* (2006.01)
*G01D 3/00* (2006.01)
*H01H 31/02* (2006.01)

(52) U.S. Cl.
USPC ........................ 713/300; 702/108; 324/555

(58) Field of Classification Search
USPC ........................................................ 713/300
See application file for complete search history.

(56) References Cited

U.S. PATENT DOCUMENTS

| 5,664,204 A * | 9/1997 | Wang ............................. 713/300 |
| 2004/0256915 A1 * | 12/2004 | Phinney .......................... 307/43 |
| 2010/0031043 A1 * | 2/2010 | Burger et al. ................. 713/170 |

FOREIGN PATENT DOCUMENTS

CN 1484147 3/2004

* cited by examiner

*Primary Examiner* — Thomas Lee
*Assistant Examiner* — Robert Cassity
(74) *Attorney, Agent, or Firm* — Novak Druce Connolly Bove + Quigg LLP

(57) ABSTRACT

A test fixture includes a first RS-232 connector and a second RS-232 connector. The data terminal ready (DTR) pin of the first RS-232 connector is connected to the DTR pin of the second RS-232 connector, and the clear to send (CTS) pin of the first RS-232 connector is connected to the CTS pin of the second RS-232 connector. The DTR pins are further connected to a power pin of each of the test computers. The test fixture sets a high level voltage for the connected DTR pins, and sets a low level voltage for the connected CTS pins according to the commands of turning on the test computers sent by the control computer, to turn on the test computers. An auto shutdown software included in each of the test computers is executed to shut down the test computers.

13 Claims, 5 Drawing Sheets

TEST FIXTURE AND METHOD USING THE DTR PINS AND CTS PINS OF RS-232 CONNECTORS FOR AUTOMATICALLY TURNING ON COMPUTERS

BACKGROUND

1. Technical Field

Embodiments of the present disclosure relate to test technology, and particularly to a test fixture and a method for automatically turning on computers according to commands of a control computer.

2. Description of Related Art

Testing computers usually includes a power button test. The power button test is performed by pressing a power button of a computer thousand times, to turn on and shut down the computer. Previously, the power button was manually tested, which was time consuming and wasteful of manpower.

For solving the above problem, an improved method was introduced. Referring to FIG. 1, the improved method uses a test fixture 1 fixed with a telescopic stick 2 to periodically hit a power button 30 of a computer 3. The stick 2 can automatically extend and retract to repeatedly press the power button 30.

However, in the improved method, the test fixture 1 can only handle one computer at a time. In addition, different computers may have different button configurations. For example, as shown in FIG. 2, the power button 30 may be designed at the front of the computer 3, at one side of the computer 3, or on the top of the computer 3. Furthermore, sizes of computers vary as well, meaning the location of the stick 2 on the test fixture 1 should be adjusted to suit different computers, or a plurality of test fixtures 1 provided for testing different computers.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

Figure 1:
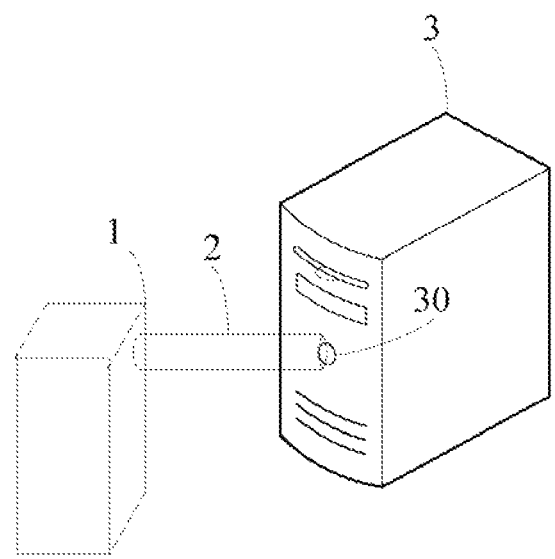
FIG. 1 is a block diagram of a system for automatically turning on a computer using a known test fixture.
Figure 2:
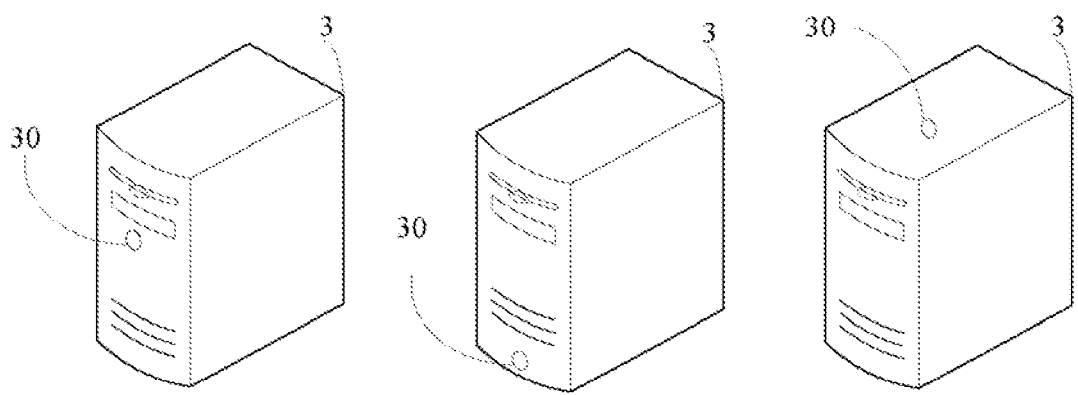
FIG. 2 gives an example showing different computer button configurations.
Figure 3:
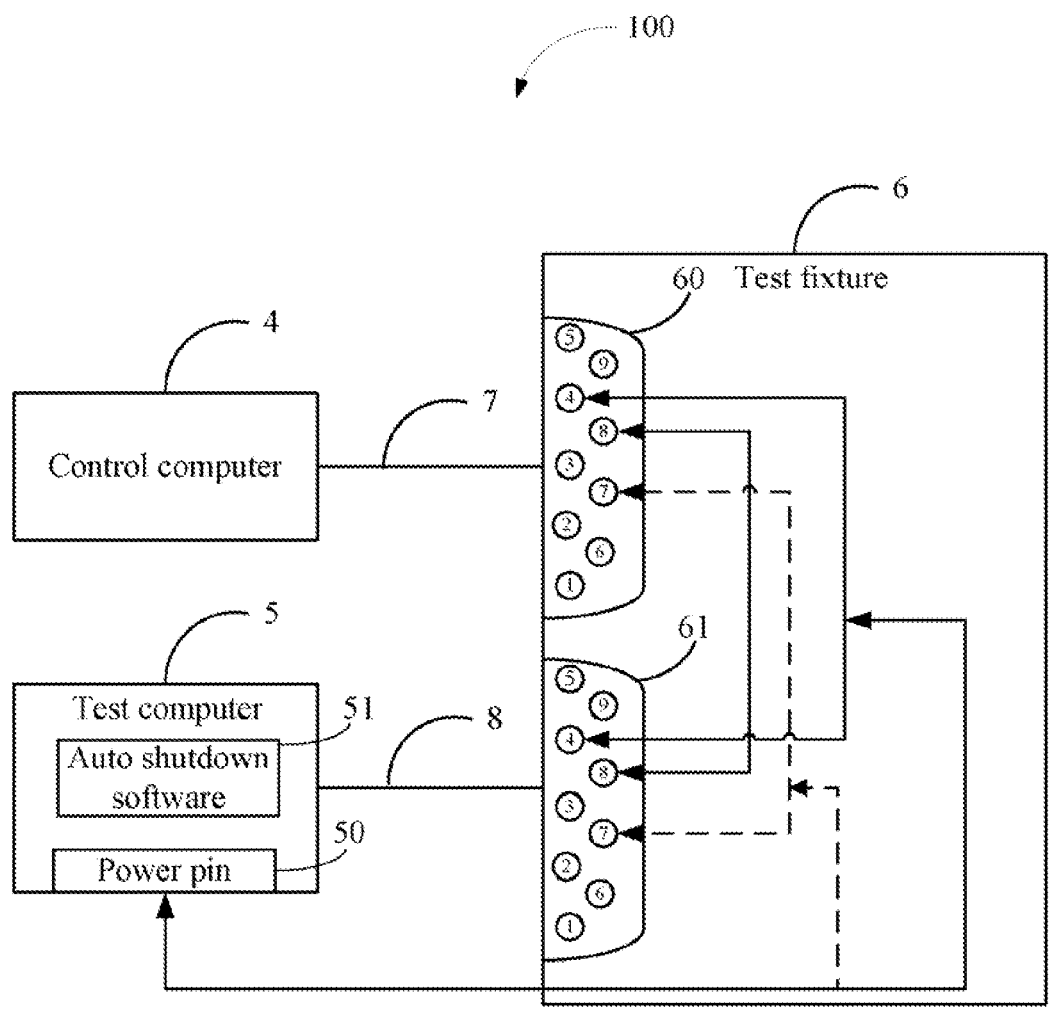
FIG. 3 is a block diagram of one embodiment of a system for automatically turning on computers using a test fixture.

FIG. 3 is a block diagram of one embodiment of a system 100 for automatically turning on one or more computers 5 using a test fixture 6. In the embodiment, the system 100 uses the test fixture 6 to automatically turn on the one or more computers 5 (one shown, hereinafter, test computers 5) according to commands sent by a control computer 4. In one embodiment, the test fixture 6 includes a first connector 60 and a second connector 61 (e.g., RS-232 connectors). In telecommunications, the RS-232 is commonly used in computer connectors. In the present application, the first connector 60 and the second connector 61 are DB9 RS-232 connectors.

Figure 4:
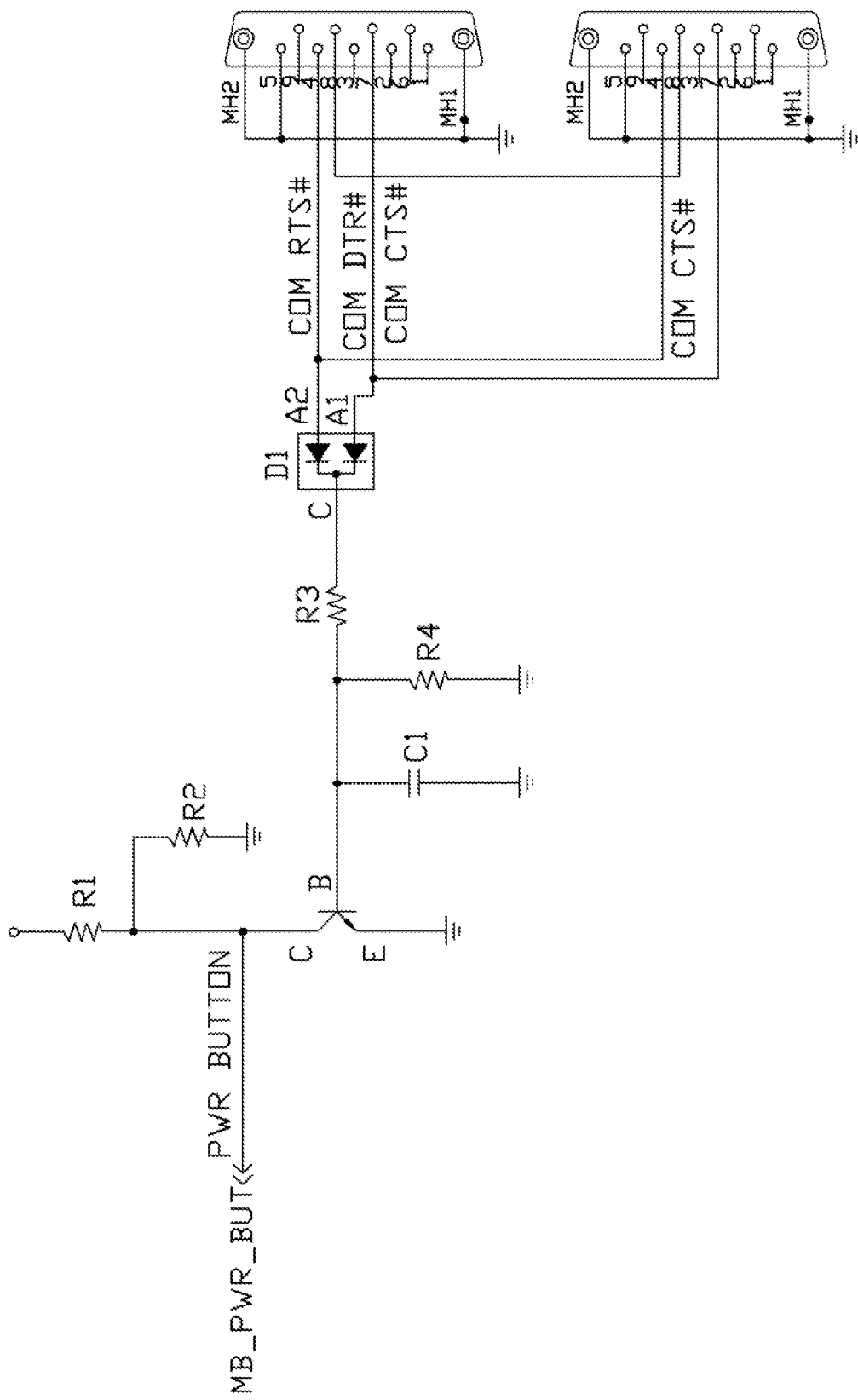
FIG. 4 illustrates one embodiment of a circuit diagram of the test fixture of FIG. 3.

Referring to one embodiment of the circuit diagram of the test fixture 6 illustrated in FIG. 4, in one embodiment, the fourth (Data Terminal Ready, DTR) pin of the first connector 60 is connected to the fourth pin of the second connector 61, and is further connected to a power pin 50 of each test computer 5, and the eighth (Clear to Send, CTS) pin of the first connector 60 is connected to the eighth pin of the second connector 61. In another embodiment, the seventh (Request to Send, RST) pin of the first connector 60 is connected to the seventh pin of the second connector 61, and is further connected to the power pin 50 of each test computer 5, and the eighth pin of the first connector 60 is connected to the eighth pin of the second connector 61.

The first connector 60 communicates with the control computer 4 through a cable 7 for receiving commands to turn on the one or more test computers 5 sent by the control computer 4. The second connector 61 communicates with the one or more test computers 5 through one or more cables 8 to turn on the one or more test computers 5 according to the commands sent by the control computer 4.

Each test computer 5 includes an auto shutdown software 51 programmed for shutting down the test computer 5 after the test computer 5 has been turned on.

Figure 5:
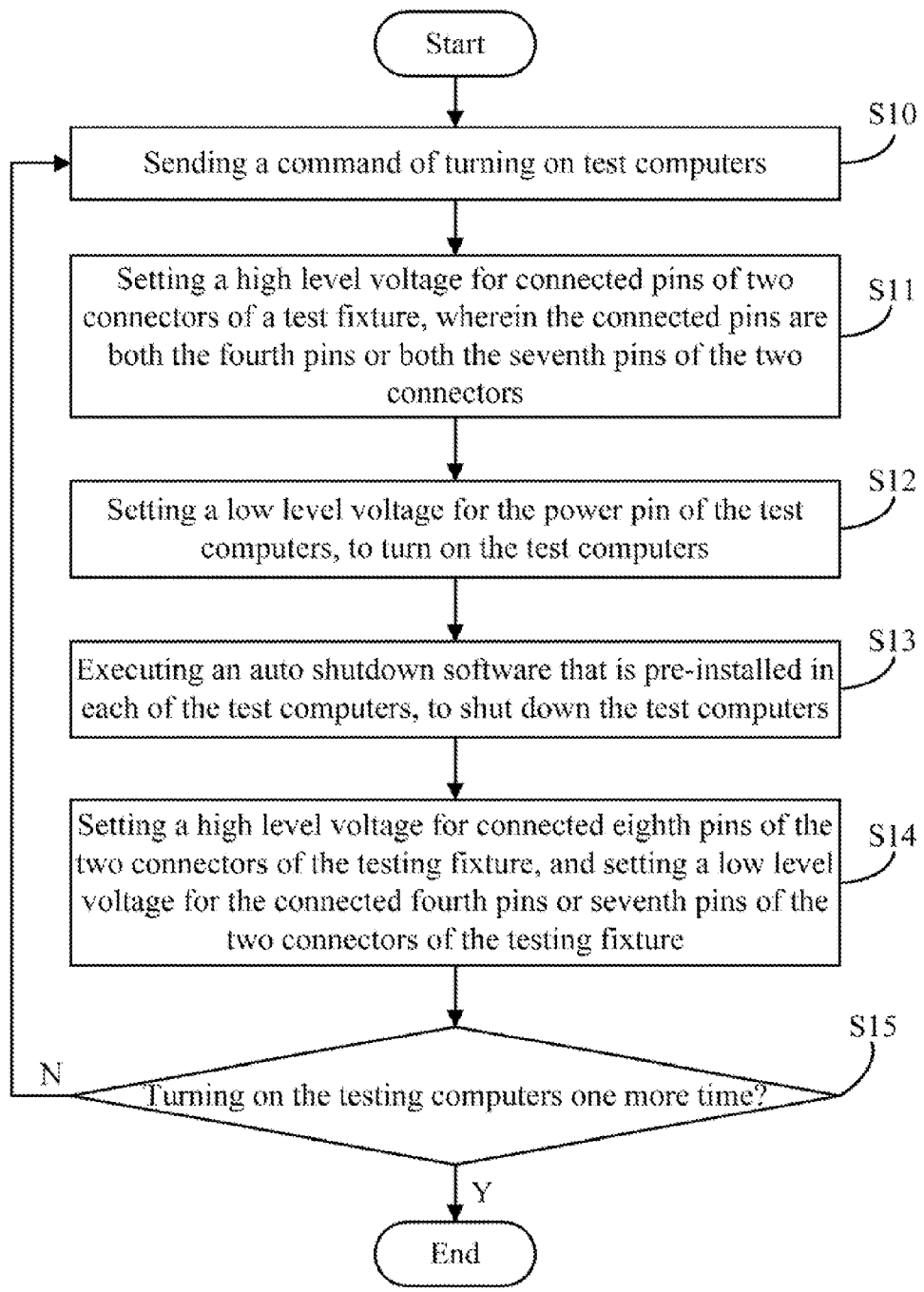
FIG. 5 is a flowchart of one embodiment of a method for turning on computers using the test fixture of FIG. 3.

FIG. 5 is a flowchart of one embodiment of a method for turning on the test computers 5 using the test fixture 6. Depending on the embodiments, additional blocks in the flow of FIG. 5 may be added, others removed, and the ordering of the blocks may be changed.

In block S10, the control computer 4 sends a command to turn on the one or more test computers 5 to the test fixture 6.

In block S11, the test fixture 6 sets a high level voltage (logical 1, for example) for the connected fourth pins of the first connector 60 and the second connector 61 or for the connected seventh pins of the first connector 60 and the second connector 61.

In block S12, the test fixture 6 sets a low level voltage (logical 0, for example) for the power pin 50 of each test computer 5, to turn on each test computer 5.

In block S13, each test computer 5 executes the auto shutdown software 51, to shut down the test computer 5.

In block S14, the test fixture 6 sets a high level voltage (logical 1, for example) for the connected eighth pins of the first connector 60 and the second connector 61, and sets a low level voltage (logical 0, for example) for the connected fourth pins or the connected seventh pins of the first connector 60 and the second connector 61.

In block S14, the control computer 4 determines whether to turn on the one or more test computers 5 one more time according to pre-received parameters, such as the number of times the test computers 5 need to be turned on. Block S10 is repeated if the determination result is to turn on the test computers 5 again. Otherwise, the flow ends if the determination result is not to turn on the test computers 5 one more time.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A test fixture, comprising:
   a first RS-232 connector and a second RS-232 connector;
   wherein:

a data terminal ready (DTR) pin of the first RS-232 connector is connected to a DTR pin of the second RS-232 connector, and a clear to send (CTS) pin of the first RS-232 connector is connected to a CTS pin of the second RS-232 connector;

the DTR pin of the first RS-232 connector is further connected to a power pin of each of one or more test computers;

the first RS-232 connector communicates with a control computer via a cable, and the second RS-232 connector communicates with the one or more test computers through one or more cables; and the test fixture sets a high level voltage for the connected DTR pins of the first RS-232 connector and the second RS-232 connector, and sets a low level voltage for the connected CTS pins of the first RS-232 connector and the second RS-232 connector according to commands sent by the control computer to turn on the test computers.

2. The test fixture of claim 1, wherein each of the one or more test computers comprises an auto shutdown software, which is executed after the test computers are turned on, to shut down the one or more test computers.

3. The test fixture of claim 2, wherein the test fixture further sets a high level voltage for the connected CTS pins, and sets a low level voltage for the connected DTR pins, after the test computers have been shut down.

4. The test fixture of claim 1, wherein both of the first RS-232 connector and the second RS-232 connector are DB9 RS-232 connectors.

5. The test fixture of claim 1, wherein the DTR pin of the first RS-232 connector is replaced by a request to send (RTS) pin of the first RS-232 connector, and the DTR pin of the second RS-232 connector is replaced by an RTS pin of the second RS-232 connector.

6. The test fixture of claim 5, wherein each of the one or more test computers comprises an auto shutdown software, which is executed after the test computers are turned on, to shut down the one or more test computers.

7. The test fixture of claim 6, wherein the test fixture further sets a high level voltage for the connected CTS pins, and sets a low level voltage for the connected RTS pins, after the test computers has been shut down.

8. A method for automatically turning on one or more test computers according to commands sent by a control computer using a test fixture which comprises a first RS-232 connector and a second RS-232 connector, the method comprising:

(a) connecting a data terminal ready (DTR) pin of the first RS-232 connector to a DTR pin of the second RS-232 connector, and connecting a clear to send (CTS) pin of the first RS-232 connector to a CTS pin of the second RS-232 connector, connecting the test fixture to the one or more test computers and the control computer through one or more cables;

(b) connecting the DTR pins of the first RS-232 connector and the second RS-232 connector to a power pin of each of the one or more test computers;

(c) setting a high level voltage for the connected DTR pins, and setting a low level voltage for the connected CTS pins of the first RS-232 connector and the second RS-232 connector according to commands sent by the control computer, to turn on the one or more test computers; and (d) executing an auto shutdown software comprised in each of the test computers, to shut down the test computers.

9. The method of claim 8, further comprising:

(e) setting a high level voltage for the connected CTS pins, and setting a low level voltage for the connected DTR pins; and (f) repeating (c) to (d) to turn on the test computers again.

10. The method of claim 8, wherein both of the first RS-232 connector and the second RS-232 connector are DB9 RS-232 connectors.

11. A method for automatically turning on one or more test computers according to commands sent by a control computer using a test fixture which comprises a first RS-232 connector and a second RS-232 connector, the method comprising:

(a) connecting a request to send (RTS) pin of the first RS-232 connector to a RTS pin of the second RS-232 connector, and connecting a clear to send (CTS) pin of the first RS-232 connector to a CTS pin of the second RS-232 connector, connecting the test fixture to the one or more test computers and the control computer with one or more cables;

(b) connecting the connected RTS pins of the first RS-232 connector and the second RS-232 connector to a power pin of each of the one or more test computers;

(c) setting a high level voltage for the connected RTS pins, and setting a low level voltage for the connected CTS pins of the first RS-232 connector and the second RS-232 connector according to commands sent by the control computer, to turn on the one or more test computers; and (d) executing an auto shutdown software comprised in each of the test computers, to shut down the test computers.

12. The method of claim 11, further comprising:

(e) setting a high level voltage for the connected CTS pins, and setting a low level voltage for the connected RTS pins; and (f) repeating (c) to (d) to turn on the test computers again.

13. The method of claim 11, wherein both of the first RS-232 connector and the second RS-232 connector are DB9 RS-232 connectors.

* * * * *